H. M. PATTON.
PROTECTOR FOR DYNAMO BELTS.
APPLICATION FILED MAR. 7, 1916.
1,235,370.
Patented July 31, 1917.
2 SHEETS—SHEET 1.
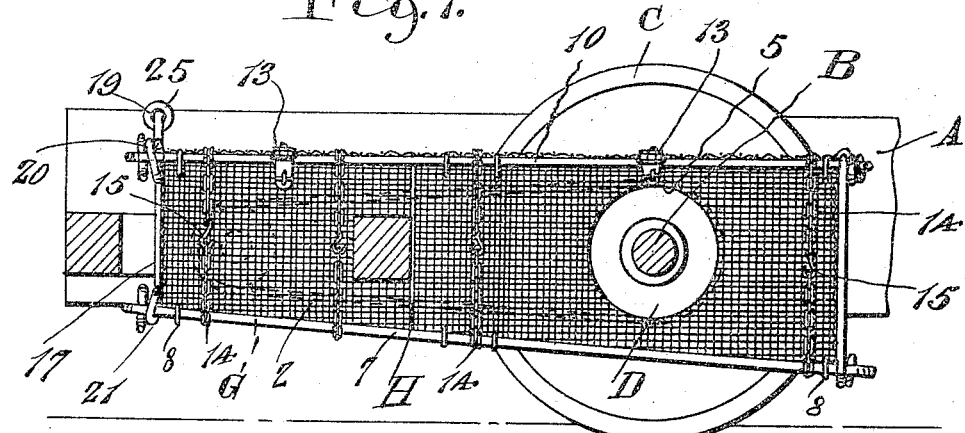
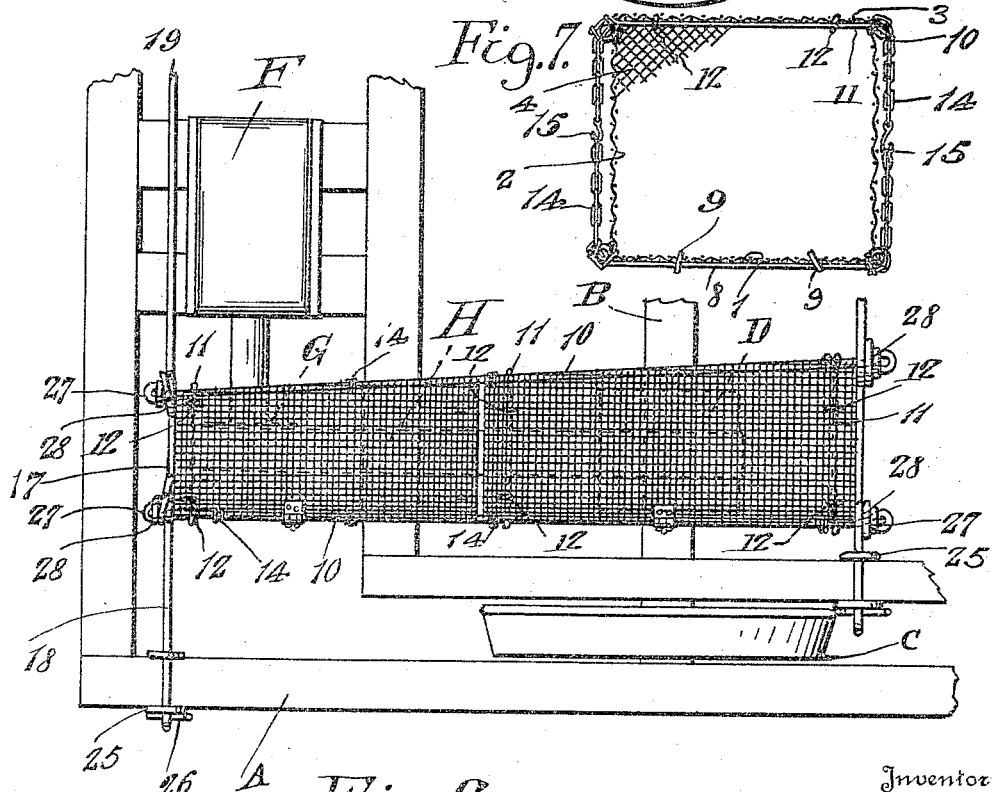

H. M. PATTON.
PROTECTOR FOR DYNAMO BELTS.
APPLICATION FILED MAR. 7, 1916.
1,235,370.
Patented July 31, 1917.
2 SHEETS—SHEET 2.
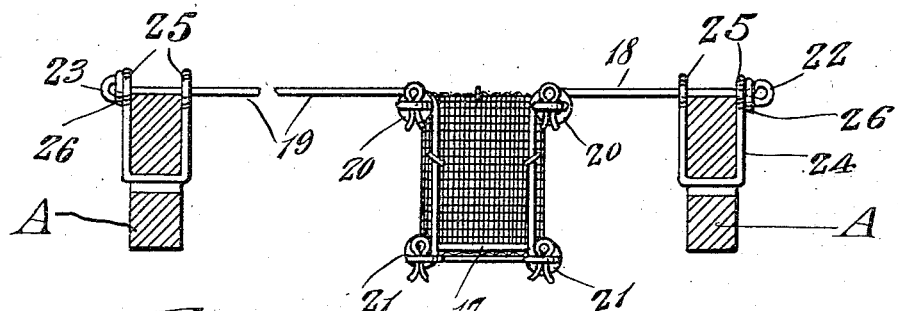
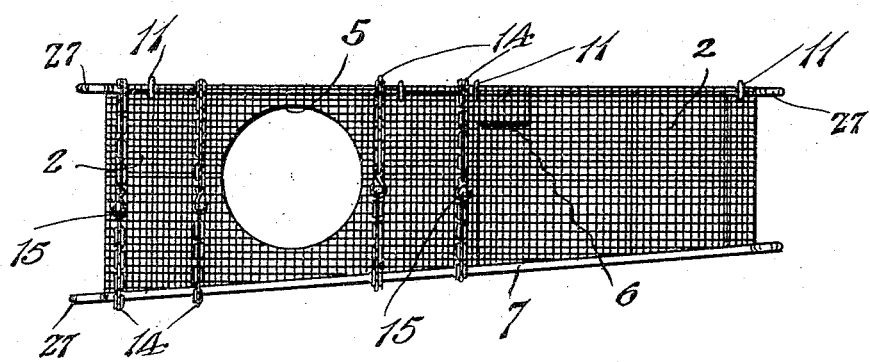
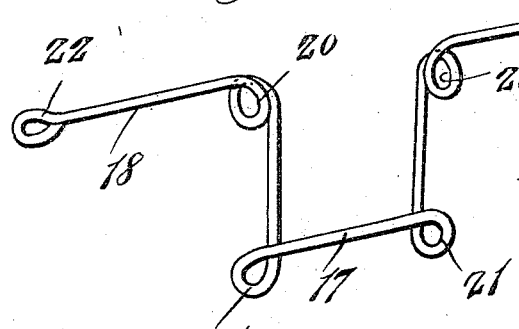
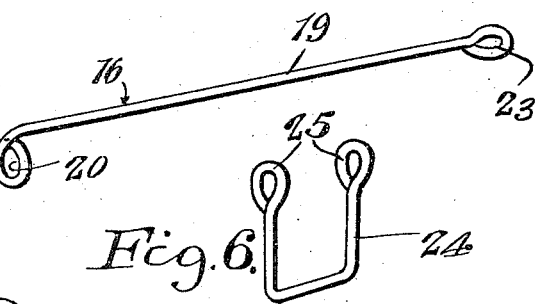
Inventor
H. M. Patton.
Witnesses.

UNITED STATES PATENT OFFICE.

HENRY M. PATTON, OF ATLANTA, GEORGIA.

PROTECTOR FOR DYNAMO-BELTS.

1,235,370.

Specification of Letters Patent.

Patented July 31, 1917.

Application filed March 7, 1916. Serial No. 82,781.

*To all whom it may concern:*

Be it known that I, HENRY M. PATTON, a citizen of the United States, residing at Atlanta, in the county of Fulton and State of Georgia, have invented certain new and useful Improvements in Protectors for Dynamo-Belts; and I do hereby declare the following to be a full, clear, and exact description of the invention, such as will enable others skilled in the art to which it appertains to make and use the same.

The object of this invention is to prevent accident from contact with the belt which connects the pulley on the dynamo, employed in the lighting system for cars, to the axle of the car truck, should the belt become accidentally disengaged from the pulley or the axle; also to prevent dirt and other foreign matter from coming into contact with the belt, so as to prevent wear of the belt.

Other objects will appear and be better understood from that embodiment of my invention of which the following is a specification, reference being had to the accompanying drawings forming a part thereof, in which:

Figure 1 is a longitudinal sectional view through a car truck frame, showing the protector applied thereto, Fig. 2 is a top plan view thereof, Fig. 3 is a forward end view of the protector, Fig. 4 is a side elevation of the protector, showing the inner side thereof, Fig. 5 is a perspective view of one of the supporting brackets, Fig. 6 is a perspective view of a clip for securing one end of one of the supporting brackets to the truck frame, and Fig. 7 is a transverse section taken through the protector.

Referring to the drawing in detail, the letter A designates a portion of a truck frame, B the axle and C one of the truck wheels, the said axle having mounted thereon a pulley wheel D. A dynamo, designated F, is suitably mounted at the forward end of the frame A and the shaft of the armature of the dynamo has a pulley G keyed thereto, said pulley G on the shaft being connected to the pulley G on the axle B by means of a belt H.

The protector comprises a rectangular shaped housing formed of the bottom wall 1, side walls 2, top wall 3 and opposite end walls 4. The side walls 2 are provided at their opposite points with openings 5 through which access can be had to the pulley D and its connections. The inner side wall of the housing is provided with an enlarged opening 6, at its forward end, through which extends that end of the armature shaft which has the pulley G mounted thereon. The housing is supported by means of the lower longitudinal rods 7, which have connection with the opposite longitudinal edges of the bottom wall 1 by means of the transverse strips 8, which have their opposite ends connected to the rods 7, and the said strips have connection with the bottom wall 1 by means of the fastening rings 9. Extending along the upper longitudinal edges of the side walls 2 is a second pair of longitudinal rods 10, and extending transversely of the last-mentioned rods are a plurality of transverse rods 11. The upper wall 3 of the housing is formed of forward and rear sections, the rods 11 having connection with the respective sections by means of the clips 12, and each rod has its inner end provided with an eye, which loosely receives the adjacent rod 10, so that the rods 11 can be swung vertically on the inner rod 10, whereby to admit of the forward and rear sections forming the top wall 3 to be raised when desired. The opposite or outer end of the rods 11 are bent downwardly and adapted to engage over the outer end rod 10 on the outer side wall 2, when the sections forming the upper wall are in closed position. Suitable hasps 13 are carried by the sections forming the upper wall 3 and are adapted to have engagement with the outer side wall of the housing when the sections are in closing position so as to prevent accidental movement of the sections to open position. Chains 14 are connected respectively, between lower and upper rods 7 and 10, and lie on the outer sides of the side walls 2 and serve to hold the side walls in vertical position, the chains having their opposed ends connected by means of the snap hooks 15.

Extending transversely of the opposite ends of the truck frame is a pair of supporting brackets 16. Each of these brackets is formed of a single length of wire bent adjacent one end to provide the U-shaped portion 17 and the horizontally extending arms 18 and 19, the arm 19 being of a length considerably greater than the length of the arm 18, as shown more particularly in Fig. 5 of the drawings. The wire is coiled at the upper and lower ends of the sides of the U-shaped portion 17 to provide the eyes 20 and 21, and the free ends of the arms 18 and 19 are similarly coiled to provide the eyes 22 and 23.

As shown more particularly in Figs. 1 and 2 of the drawing, the U-shaped portions 17 of the brackets are located at the outer sides of the opposite end walls of the housing and are connected thereto in any suitable manner, and the arms 18 and 19 have connection with the side bars of the truck frame A by means of U-shaped clips 24, which engage over the side bars of the truck frame and have the free ends of their sides provided with eyes 25, through which extend the free ends of the arms 18 and 19, suitable pins 26 being passed through the eyes in the ends of the arms 18 and 19 so as to hold the arms in position. Opposite ends of the lower and upper rods 11 and 10 extend through the eyes 20 and 21 formed on the upper and lower ends of the sides of the U-shaped portion 17 so as to support the rods 7 and 10 and are provided with eyes 27 for the reception of pins 28 to prevent disconnection of the rods 7 and 10 from the supporting bracket.

What I claim as new is:

1. The combination with a wheel truck frame, an axle journaled in the frame and a dynamo driving belt operatively connected to the axle thereof, and a housing for the belt, of supporting brackets for the housing, each bracket including a U-shaped portion, means for connecting the U-shaped portions of the brackets to the housing, and arms carried by the sides of the U-shaped portions of the brackets and engaging over the sides of the wheel truck, and means for connecting the arms to the wheel truck.

2. The combination with a wheel truck frame, an axle journaled therein, an armature shaft, and a belt operatively connected to the axle and the armature shaft, of a housing inclosing the belt and consisting of top, bottom, opposite side and end walls, one of the side walls having openings therein for the reception of the axle and the armature shaft, rods extending along the meeting edges of the side, bottom and top walls, means for connecting the top, bottom and side walls to the rods, the said rods having their opposite ends provided with eyes, supporting brackets located at the opposite ends of the housing, each bracket consisting of a U-shaped portion engaging the adjacent end wall of the housing and the said U-shaped portions having eyes formed at the upper and lower ends of the sides thereof and receiving the eye portions on the ends of the rods, fastening means extending through the eyes on the rods, and arms carried by the upper end of the sides of the U-shaped portions of the brackets and connected to the wheel truck frame.

3. The combination with a wheel truck frame, an axle journaled therein, and a dynamo operating belt connected to the axle, of a housing encircling the belt and having opposite side walls provided with openings for the passage of the axle, a top wall formed of sections having hinged connection to one of the side walls, brackets for supporting the housing and having connection with the truck frame, and flexible elements engaging around the top, bottom and opposite side walls of the housing, for the purpose specified.

In testimony whereof I affix my signature in presence of two witnesses.

HENRY M. PATTON.

Witnesses:
CALVIN W. MORNGROVE,
FOSTER L. HUNTER.

Copies of this patent may be obtained for five cents each, by addressing the "Commissioner of Patents, Washington, D. C."